United States Patent

[11] 3,627,923

[72] Inventor Horst Bachmann
Darmstadt, Germany
[21] Appl. No. 23,304
[22] Filed Mar. 27, 1970
[45] Patented Dec. 14, 1971
[73] Assignee Fernseh GmbH
Darmstadt, Germany
[32] Priority Apr. 5, 1969
[33] Germany
[31] P 19 17 671.7

[54] TELEVISION CAMERA
2 Claims, 2 Drawing Figs.

[52] U.S. Cl. .......... 178/7.2, 178/7.9, 178/DIG. 30, 178/7.81, 312/7 TV
[51] Int. Cl. .......... H04n 5/26, H04n 7/02
[50] Field of Search .......... 178/7.2, DIG. 30, 7.8, 7.81, 7.9; 312/7 TV, 306, 310; 88/1.5 R, 1.5 NR; D56/4 (7)

[56] References Cited

UNITED STATES PATENTS

| | | | |
|---|---|---|---|
| 2,769,676 | 11/1956 | Larsen et al. .......... | 312/306 |
| 3,435,136 | 3/1969 | Bachmann et al. .......... | 178/6.8 |

FOREIGN PATENTS

| | | | |
|---|---|---|---|
| 866,494 | 4/1961 | Great Britain .......... | 178/7.81 |
| 1,130,846 | 6/1962 | Germany .......... | 178/7.9 |

*Primary Examiner*—Robert L. Richardson
*Attorney*—Ernest F. Marmorek

ABSTRACT: The television camera has a recess in its body for receiving a swingable electronic viewfinder. The viewfinder is pivotally supported at its center of gravity between the limbs of a fork lever. The fork lever is hinged to the camera to swing about an axis that lies beyond the range of movement of the viewfinder. The fork is spring loaded and provided with a controllable locking device.

Inventor:
Horst Bachmann by [signature], Attorney

Inventor:
Horst Bachmann by [signature]
Attorney

TELEVISION CAMERA

The invention relates to a television camera with a pivotally mounted electronic viewfinder.

When taking television pictures it has proved to be useful if the electronic viewfinder of the television camera is pivotally mounted because in that case the camera operator can conveniently follow the scenes in the camera viewfinder independently of the position of the camera and is able to adjust the camera according to the director's instructions.

In the previously known television cameras of this type, the electronic viewfinder is pivotally mounted in its center of gravity upon the camera casing and is accommodated in a recess at the rear side of the camera. The arrangement has the disadvantage that when the viewfinder is swung, the lower side and the rear side thereof enters more or less deeply into the part of the television camera surrounding the sides of the viewfinder. Consequently this portion of the television camera situated within the swinging range of the viewfinder must be kept clear of components belonging to the camera, as a result of which the camera dimensions must be made correspondingly larger.

BRIEF SUMMARY OF THE INVENTION

The purpose of the present invention is to provide a television camera with a pivotally mounted electronic viewfinder wherein the aforementioned disadvantage is avoided.

More particularly, it is an object of this invention to provide a television camera with a swingable viewfinder which has a compact configuration.

It is another object of this invention to provide means for locking the swingable viewfinder in its two extreme positions.

It is still another object of this invention to facilitate manipulation of the swingable viewfinder.

In accordance with the present invention the view finder is pivotally mounted in its center of gravity between the limbs of a fork, and the fork can be pivoted about an axis lying behind the viewfinder on the body of the camera.

This has the advantage that the recess or the cavity which is provided at the upper portion of the rear part of the camera for the purpose of accommodating the viewfinder needs to possess only the dimensions of the viewfinder.

Appropriately the limbs of the fork are connected at their ends with a tube and the tube is pivotable about its longitudinal axis and is supported on two studs. To facilitate the manipulation of the viewfinder, a leaf spring assembly is clamped in a slotted disc fixed at the center of the tube interior, while the ends of the leaf spring assembly are inserted at the tube ends in slots of the two fixed studs; the slots in the studs are arranged to be staggered, preferably through 60°, with respect to the slot in the disc. The leaf spring assembly is prestressed thereby in such a manner that a counteracting force is provided to neutralize the weight of the viewfinder. Thus, without any expenditure of power on the part of the operator, the viewfinder is capable of being moved from the lower position inside the television camera to the upper position externally of the camera.

The two end positions of the range of swing of the viewfinder are determined by a locking device operable from the rear side of the camera. In order that the viewfinder might assume any position of inclination in the swung-out position, an adjustable friction device is provided between the ends of the fork and the view finder.

BRIEF DESCRIPTION OF SEVERAL VIEWS OF THE DRAWING

The invention will now be explained in more detail with reference to a practical embodiment represented in the accompanying FIGS. 1 and 2, in which only those parts are indicated which are essential for an understanding of the invention. In each of the figures equivalent parts are provided with the same reference characters.

DETAILED DESCRIPTION

Figure 1:
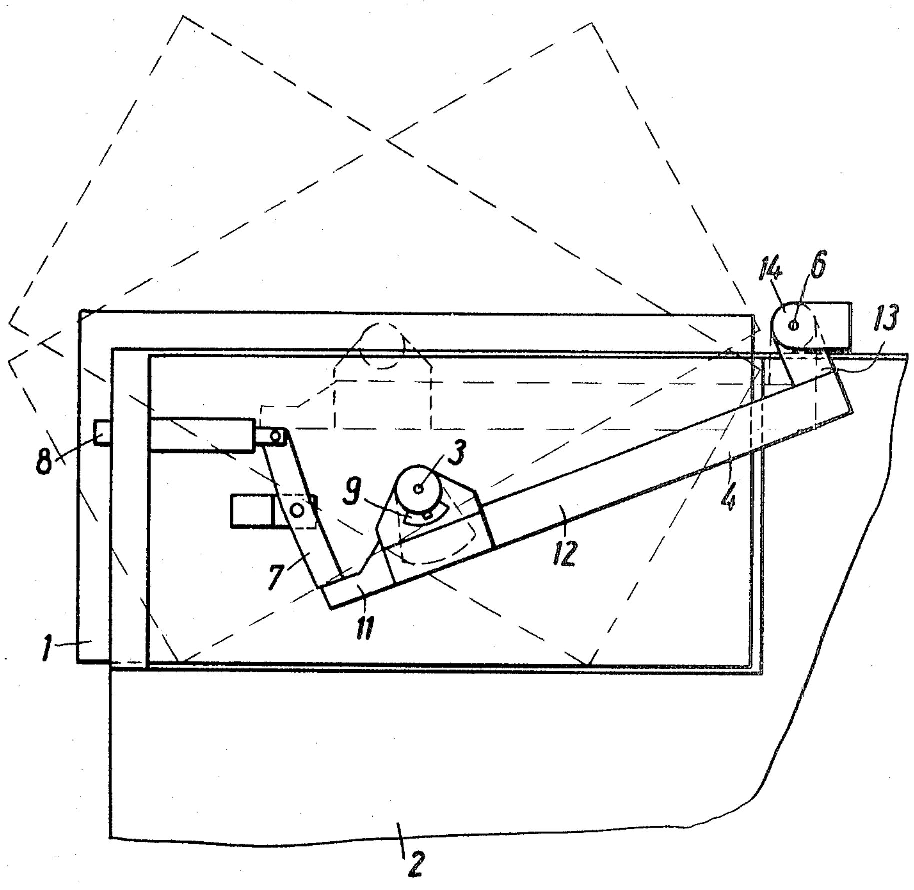
FIG. 1 is a fragmentary side view of the rear part of the television camera with the mounted electronic view finder.

In FIG. 1 there is shown the rear portion of the camera 2 which contains the electronic viewfinder 1. The viewfinder 1 is rotatably mounted in its center of gravity to pivot about an axis 3 in a fork 4. The fork 4 is itself pivotable about an axis 6 which is situated on the camera 2 beyond the manipulation space for the viewfinder 1.

In addition to showing the normal position of the viewfinder 1 in the camera 2, there are also shown—indicated by dashed lines—two positions of the viewfinder 1 when the fork 4 is swung upwardly into its uppermost position. In this uppermost position, after the swinging of the fork 4 about the axis 6, the viewfinder 1 is in the one case inclined about the axis 3 by 30° upwardly with respect to the optical axis of the camera 2, and in the other case through 30° downwardly with respect to the optical axis of the camera. In the normal position and in the upwardly swung position the view finder 1 can be locked by means of a locking device 7, which is operable from the rear side of the camera through a pushing rod 8. In order also that the view finder may be able to assume any desired position within the prescribed range of inclinations (±30°) an adjustable friction device 9 is provided at the rotation axis 3.

Figure 2:
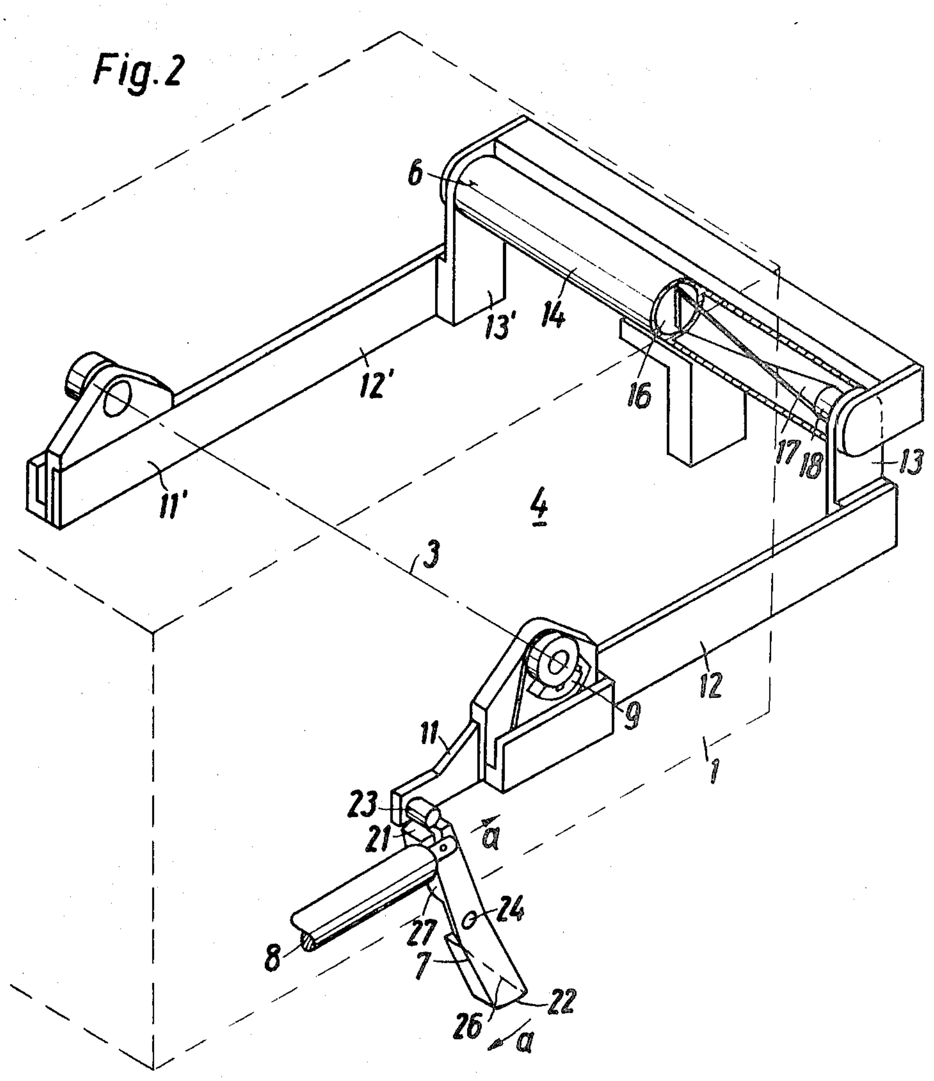
FIG. 2 is a fragmentary perspective view, partly in section, of the device for swinging the view finder into and out of its operative position in the camera.

FIG. 2 shows in a perspective view the fork 4 in its upper position, whereby the viewfinder 1 is shown in dashed lines. The viewfinder 1, rotatable in its center of gravity about the axis 3, is mounted upon the outer ends 11 and 11' of the limbs 12 and 12' of the fork 4. The other ends of the limbs 12 and 12' of the fork 4 are provided with upwardly directed members 13 and 13' and connected by a transverse tube 14 pivotally mounted on the camera 2. The longitudinal axis of the tube 14 coincides with the axis 6.

As may be seen from the broken away right hand half of the tube 14, there is provided at the center of the tube 14 a slotted disc 16, in which a leaf spring assembly 17 is clamped. The ends of the spring assembly 17 are inserted in the slots of two stationary studs 18 connected with the camera 2 and pivotally supporting the ends of the tube 14. The slots in the studs 18 are arranged to be angularly staggered through about 60° with respect to the slot in the disc 16 so that the leaf spring assembly 17 and thereby the entire view finder is prestressed. Because the prestress upon the leaf spring assembly 17 is proportional to the weight of the view finder, the result is achieved that, after being unlocked by the camera operator, the viewfinder 1 does not need to be raised, but can automatically lift itself out of the camera casing.

The locking device comprises an elongated guide member 7 that is swingably supported on a bolt 24. The limb 12 of the fork 4 has an extended end portion 11 with a laterally projecting stud 23. The guide member 7 is provided with a top abutment surface 21, with a bottom abutment surface 21 and with guiding surfaces 27 and 26. The angular position of the guide member 7 is controlled by a jointed pushing rod 8. The pushing rod 8 protrudes through the rear wall of the camera 2 and is terminated with a pushbutton. After operating the pushbutton, the pushing rod 8 turns the guide member 7 in the direction of arrows *a*. Due to the load from the leaf spring assembly 17, the fork 4 is forced downwardly along the guide surfaces 27 and 26 until the stud 23 abuts against the lower abutment surface 22. As a consequence, the viewfinder 1 is locked in its rest position (FIG. 1). In the same way but in the opposite direction, the viewfinder 1 is swung up into its operative upper position (FIG. 2).

As seen in FIG. 1, the viewfinder 1 during its rest position is located within a recess that is provided in the body of the television camera 2. Due to the fact that the axis 6 of the fork 4 is situated on the top surface of the camera 2 away from the above mentioned recess, the viewfinder 1 can be readily swung up from its rest position within the recess into its operative position above the top surface of the camera even if the dimensions of the recess equal substantially to the size of the viewfinder 1. Consequently, the configuration of the television camera according to this invention can be very compact and convenient for manipulation.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. A television camera with swingable viewfinder means, comprising, in combination,
- a recess in said camera for receiving said viewfinder means,
- fork lever means having two limbs and a transverse member connecting said limbs,
- said viewfinder means being pivotally mounted between the end portions of said limbs, and
- said transverse member being pivotally supported on said camera to swing about an axis lying beyond said recess,
- wherein said fork lever means is spring loaded to counteract the weight of said viewfinder means, wherein said transverse member includes a tubular piece extending coaxially with said axis of said fork and being pivotally supported on two fixed studs connected to said camera,
- a slotted member integrally connected to an inside wall portion of said tubular piece, and
- a torsion spring assembly clamped in said slotted member and, at the end thereof, firmly connected the said studs, to spring load said viewfinder means.

2. A television camera with swingable viewfinder means, comprising, in combination,
- a recess in said camera for receiving said viewfinder means,
- fork lever means having two limbs and a transverse member connecting said limbs,
- said viewfinder means being pivotally mounted between the end portions of said limbs, and
- said transverse member being pivotally supported on said camera to swing about an axis lying beyond said recess,
- wherein said fork lever means is spring loaded to counteract the weight of said viewfinder means, further comprising a mechanical locking device controlled by a jointed pushing rod, said pushing rod being operable from said camera to bring said locking device into a locking engagement with a limb of said fork lever means when said fork lever means is in one of its end positions.

* * * * *